United States Patent
Yip et al.

(10) Patent No.: US 6,970,312 B2
(45) Date of Patent: Nov. 29, 2005

(54) FULL AMPLITUDE TIME-BASED SERVOPOSITIONING SIGNALS

(75) Inventors: Yung Yip, Afton, MN (US); Richard W. Molstad, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 159 days.

(21) Appl. No.: 10/328,460

(22) Filed: Dec. 23, 2002

(65) Prior Publication Data

US 2004/0120061 A1 Jun. 24, 2004

(51) Int. Cl.⁷ .................................................. G11B 5/09
(52) U.S. Cl. .......................................... 360/48; 360/75
(58) Field of Search .............................. 360/48, 77.12, 360/75, 46, 76, 77

(56) References Cited

U.S. PATENT DOCUMENTS

| | | | | |
|---|---|---|---|---|
| 3,503,059 A | * | 3/1970 | Ambrico | 360/45 |
| 4,166,282 A | * | 8/1979 | Ragle et al. | 360/77.06 |
| 4,613,915 A | * | 9/1986 | Crouse et al. | 360/77.02 |
| 5,121,270 A | * | 6/1992 | Alcudia et al. | 360/77.01 |
| 5,587,850 A | * | 12/1996 | Ton-that | 360/77.08 |
| 5,689,384 A | * | 11/1997 | Albrecht et al. | 360/77.12 |
| 5,930,065 A | | 7/1999 | Albrecht et al. | |
| 6,021,013 A | | 2/2000 | Albrecht et al. | |
| 6,111,719 A | * | 8/2000 | Fasen | 360/73.04 |
| 6,222,698 B1 | * | 4/2001 | Barndt et al. | 360/76 |
| 6,462,904 B1 | | 10/2002 | Albrecht et al. | |
| 6,710,967 B2 | * | 3/2004 | Hennecken et al. | 360/77.12 |
| 6,735,039 B1 | * | 5/2004 | Molstad | 360/77.12 |
| 6,781,778 B1 | * | 8/2004 | Molstad et al. | 360/48 |
| 6,873,487 B2 | * | 3/2005 | Molstad | 360/75 |

* cited by examiner

*Primary Examiner*—David Hudspeth
*Assistant Examiner*—Dismery Mercedes
(74) *Attorney, Agent, or Firm*—Eric D. Levinson

(57) ABSTRACT

Time-based servo positioning systems, methods, formats, and data recording media used in association with the same, employing full amplitude recording signals to improve the available signal as media thicknesses decrease.

16 Claims, 6 Drawing Sheets

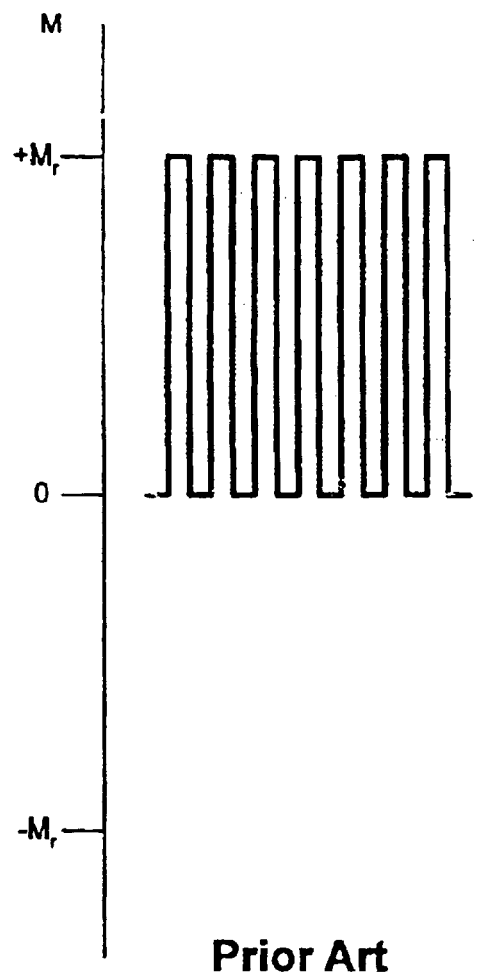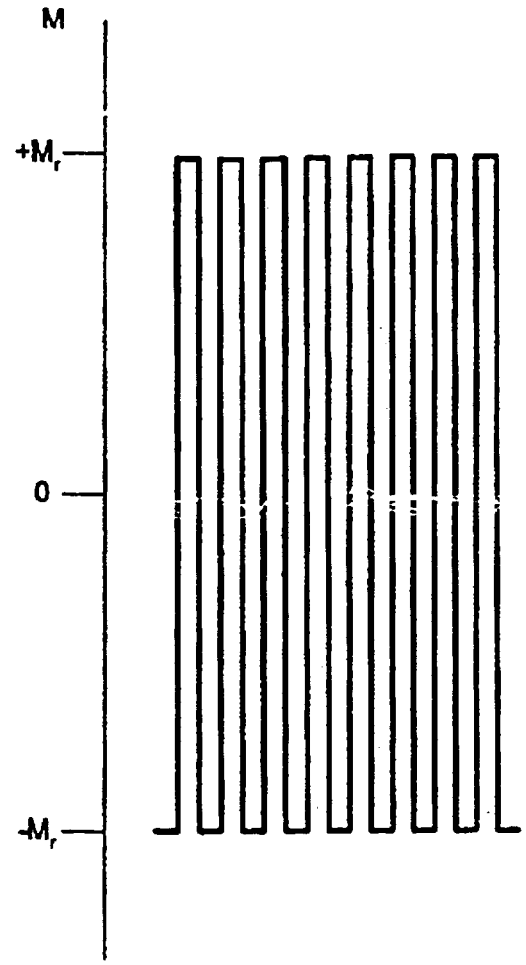
Prior Art
Figure 1A
Figure 1B

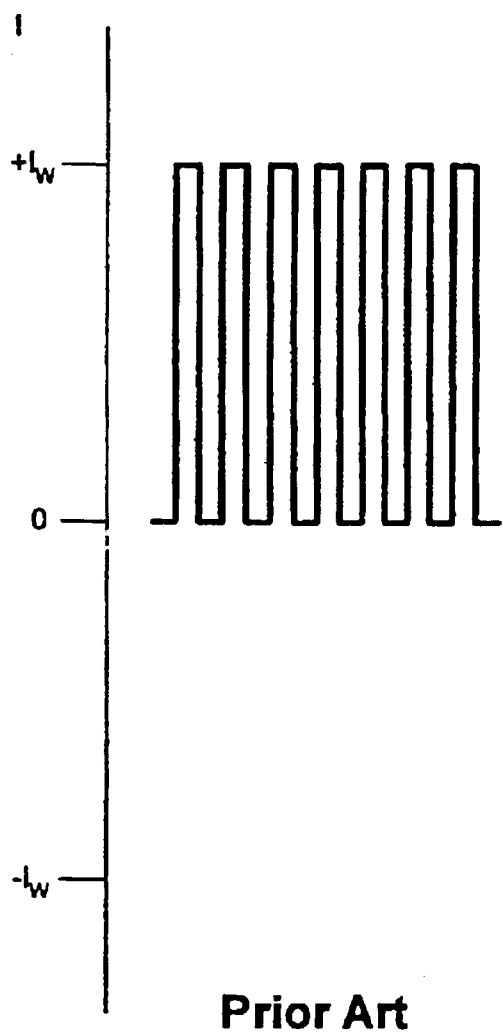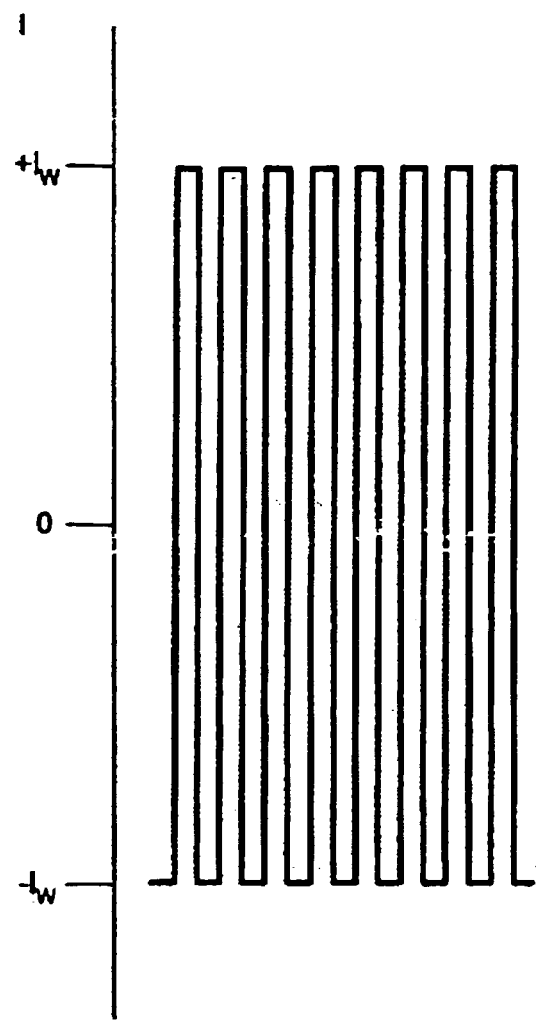
Prior Art
Figure 3A
Figure 3B

FULL AMPLITUDE TIME-BASED SERVOPOSITIONING SIGNALS

FIELD OF THE INVENTION

This invention concerns systems and methods for time-based servo positioning in the context of linear data recording media such as magnetic tape.

BACKGROUND OF THE INVENTION

Modern data storage systems use servo positioning (or "servo") systems to guide their recording and playback components with respect to a recording medium, and thus enable high track density, which increases data storage capacity. Errors in the ability to follow the servo positioning signals on the medium can cause unacceptable reductions in storage capacity, recording/playback rates, and other parameters that are important to consumers (and thus to system manufacturers).

One type of servo patterns or formats for linear magnetic tape recording systems employs so-called time-based servo techniques, examples of which are disclosed in U.S. Pat. Nos. 5,689,384; 5,930,065; and 6,021,013 (all of which are incorporated by reference in their entireties). Commercial magnetic tape drives such as the IBM model 3570 and drives known under the names "Ultrium" and "Accelis," as described by the Linear Tape Open (LTO) consortium, use time-based servo positioning systems.

The advantages of time-based servo systems include very wide dynamic range; inherent track identification; low DC centerline error; and the ability to qualify position error signal (PES) without absolute determination of the servo signal. Disadvantages include extreme sensitivity to tape speed during writing; sensitivity to high frequency speed error during reading; and poor scalability to very small track pitches.

SUMMARY OF THE INVENTION

In general terms, the invention may be embodied in time-based servo positioning systems, methods, and formats, or in data recording media used in association with the same, and therefore this disclosure should be understood in that regard even if only an example of a particular embodiment is described in detail. Similarly, this disclosure should be understood to apply to either analog or digital signals, in accordance with principles known in the art. Thus, the terms "signal," "data," and the like may be used interchangeably, and should be understood to apply to either analog or digital representations of information.

In the most basic embodiments of the invention, a servo positioning system for a data recording system is used in combination with a linear data recording medium, preferably magnetic recording tape. Written or recorded on the medium are servo positioning signals in which the recorded magnetic transitions have magnetization moments (M) that range between −M and +M in value, as opposed to between zero and +M or between zero and −M. Appropriate circuitry responds to the magnetization transitions and produces position error signals by sampling the time-based servo signal.

One specific embodiment of the invention is a linear magnetic data recording medium, comprising a time-based servo signal in the form of at least one servo mark transition at which magnetization moment values of the signal change from a negative value to a positive value.

Another specific embodiment of the invention is a servo positioning system. One portion of the system is a linear magnetic data recording medium, upon which is recorded a time-based servo signal in the form of transitions between a negative magnetization value and a positive magnetization value. Another portion of the system is any convenient circuitry that is responsive to the time-based servo signal and produces a position error signal by reading the time-based servo signal. Another portion of the system is any convenient means for reducing the position error signal by repositioning the reading head.

Yet another specific embodiment of the invention is a method of writing servo positioning signals on a magnetic data recording medium. The method comprises using a primary recording head to write a time-based servo signal on the medium. The time-based servo signal is in the form of transitions between a negative magnetization value and a positive magnetization value. The time-based servo signal is read with a reading head and position error signal is generated. Then, the position error signal is reduced by repositioning the reading head.

BRIEF DESCRIPTION OF THE DRAWINGS

The accompanying drawings show a particular embodiment of the invention as an example, and are not intended to limit the scope of the invention.

FIG. 1A is a schematic diagram of the recorded magnetization (M) of a prior art servo writing signal, and FIG. 1B is a schematic diagram of the recorded magnetization (M) servo writing signals employed in embodiments of the invention.

FIG. 3A is a schematic diagram of the servo write current profile of a prior art recording scheme, and FIG. 3B is a schematic diagram of the servo write current profile of the invention.

DETAILED DESCRIPTION

Figure 2A:
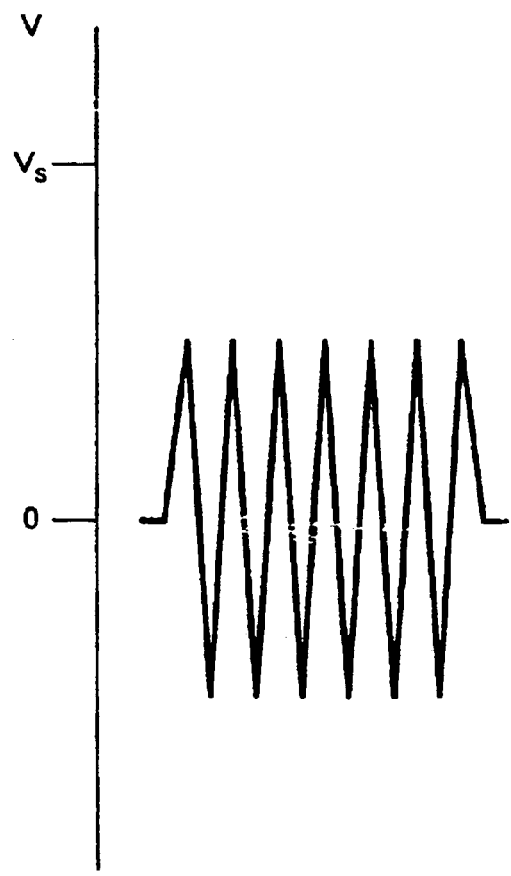
FIGS. 2A and 2B are schematic diagrams of the resultant servo signal output voltage ($V_s$) signals corresponding to the respective magnetization profiles of FIGS. 1A and 1B.
Figure 2B:
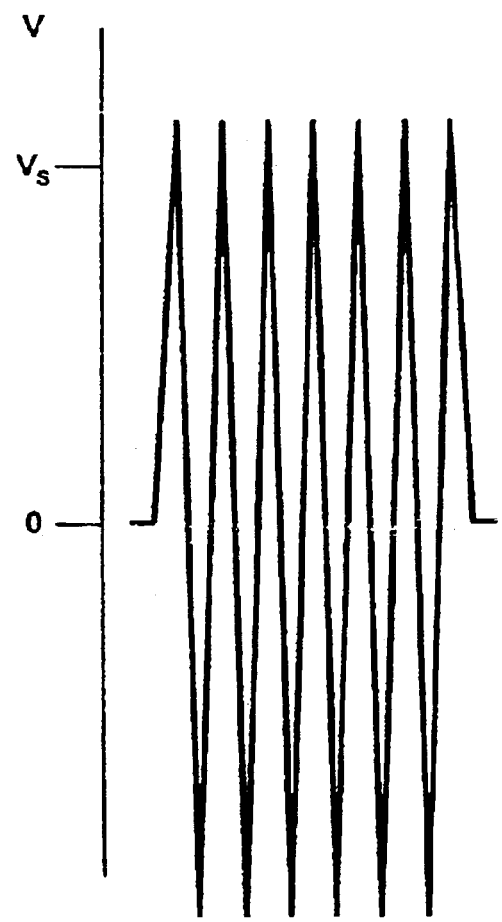

In general terms, the invention can be embodied in an entire system of data recording and playback, including the combination of a drive and a linear recording medium; or as only the recording medium portion of such a system; or as methods for recording or playing back data in combination with the data recording medium. Thus, while the following description may occasionally focus on only one preferred aspect of an entire system (e.g., the writing of servo patterns on tape) to disclose the preferred embodiment of the invention, this is by way of example only, and not a limitation on the scope of the invention. It should be understood that the full scope of the invention includes other aspects of the system depending on the circumstances, such as combinations of the medium and drive, and methods of using such combinations or relevant portions of them.

In prior art formats such as LTO, the available servo signal output created by the unipolar transitions of the time-based servo patterns are limited to half of the capability of the magnetic medium. As illustrated in FIG. 1A, this is because the change in magnetization moment (M) at servo mark transitions varies, from M=0 to M=+$M_r$, where $M_r$ is the remnant magnetic moment of the tape.

As the physical thickness of magnetic layers on tapes decreases (to improve high recording density response, for example), the available servo signal reduces linearly with thickness. The position error signal (PES) of the servo system is, to first order, proportional to the system signal to noise ratio (SNR). Thus, as the servo signal is reduced with decreasing tape thickness, so is the SNR.

To increase the available servo signal, as shown in FIG. 1B, the invention relies on the recording of the servo transitions at levels between negative and positive magnetization levels, preferably between $M=-M_r$ and $M=+M_r$. This effectively doubles the available servo signal, and thus improves the SNR and the PES. It is preferred, but not necessary, that the absolute value of the negative and positive magnetization values be the same, and so this will be described below with the understanding that it is not a limitation on the scope of the invention.

It is possible to implement such a so-called "$-M_r$ to $+M_r$" recording scheme by maintaining a continuous DC write current sufficient to record to the medium at $M=-M_r$, and then reverse the polarity of the current to record servo transitions. This approach is simple in concept but has a severe practical constraint.

Conventional servo writing heads are designed to have low inductance, so that they have fast rise times for improved performance. Therefore, they employ coils that have relatively few turns and thus require several amperes of current to generate suitable recording signals. Significant amounts of heat are generated if the circuit continuously sustains several amperes in such a fast switching environment.

FIGS. 3A and 3B compares the write current profiles of a typical prior art "0 to $M_r$" approach FIG. 1A and the "$-M_r$ to $+M_r$" approach of the invention FIG. 1B. In the typical prior art 0 to $M_r$ scheme, the write driver duty cycle is less than 10% for an LTO-type recording pattern. The heat dissipation need is on the order of only a few tens of watts. To implement the continuous DC approach just described, the write driver circuit duty cycle increases to 100%, and thus the circuit must dissipate several tens of watts of power in an area of only approximately one square centimeter.

Figure 4:
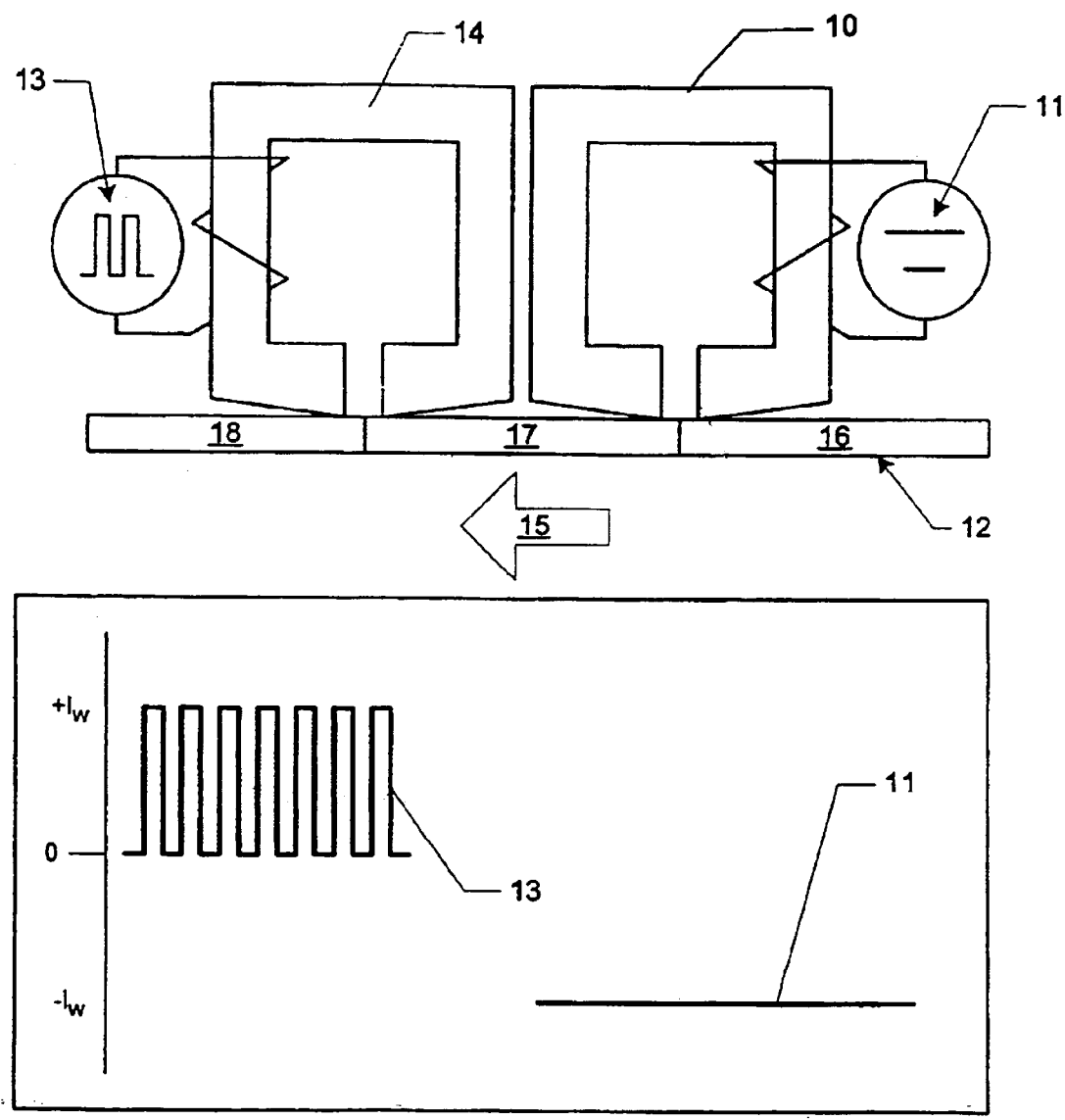
FIGS. 4 and 5 are schematic diagrams of preferred embodiments of the invention.

There are two preferred ways to implement the "$-M_r$ to $+M_r$" time-based servo writing scheme of the invention and avoid this constraint (although systems which do not avoid the constraint are within the full scope of the invention). The first, as illustrated schematically in FIG. 4, is to employ an independent secondary write head 10 to record a DC signal 11 on the tape 12 in addition to the servo transitions that are written by the conventional primary servo write head 14. The additional secondary head 10 is situated in-line and upstream of the primary (unipolar) head 14, as indicated by the arrow 15 showing the direction of motion of the tape 12 relative to the heads 10, 14. This ensures that the secondary head 10 magnetizes the tape 12 before the primary head 14.

Figure 6:
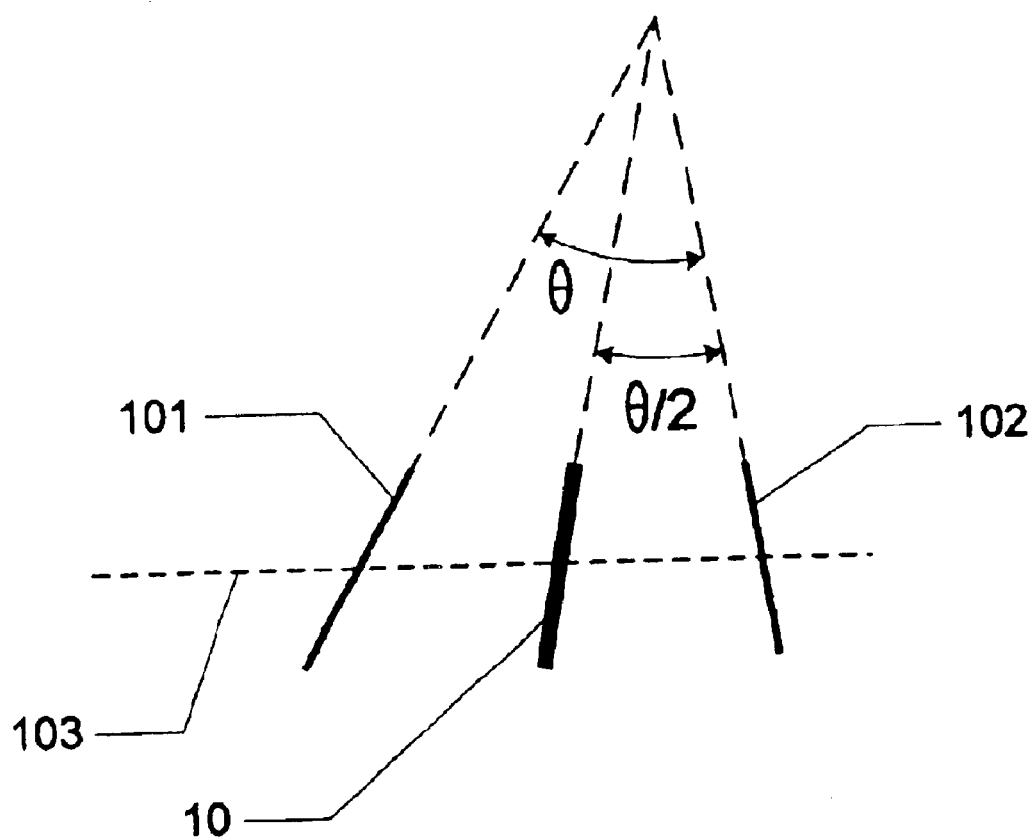
FIG. 6 is a schematic diagram of a preferred embodiment of the invention.

As illustrated in FIG. 6, the secondary write head 10 preferably has a track width as wide as the target servo track width defined by the servo marks 101 and 102. It is preferred, but not required, for the orientation of the secondary head gap to be parallel to the bisector of the included angle θ that the components of the time-based servo pattern make with each other. In less preferred embodiments, deviations from the bisector angle are acceptable.

In the generic servo format illustrated in FIG. 6, servo marks 101 and 102 are located at arbitrary angles to the track direction 103. In the LTO format, servo marks 101 and 102 are arranged symmetrically about the line perpendicular to track direction 103, each at an angle of six degrees from the perpendicular, and thus the included angle is θ=12° and the bisector is zero degrees. However, as FIG. 6 illustrates, the invention is not limited to the LTO format, or even to other formats having symmetric patterns.

Typically, the tape 12 is previously erased, such as by an AC signal (not shown) to produce fully erased portion 16. A DC current 11 having proper polarity and magnitude ($-I_w$) passes through the winding of the secondary head 10 to saturate the erased portion 16 of tape 12 to the $M=-M_r$ level, creating portion 17. Next, the primary head 14 records the servo transitions at the $M=+M_r$ level. The result is a magnetization which varies between $M=-M_r$ and $M=+M_r$ on the servo recorded portion 18 of tape 12.

In this embodiment, the magnetomotive force ("mmf") output of the primary head 14 is the same as in the prior art "0 to $+M_r$" scheme. Thus, the write driver circuit of this embodiment of the invention does not require any additional heat dissipation than does the write driver circuit of the prior art.

Figure 5:
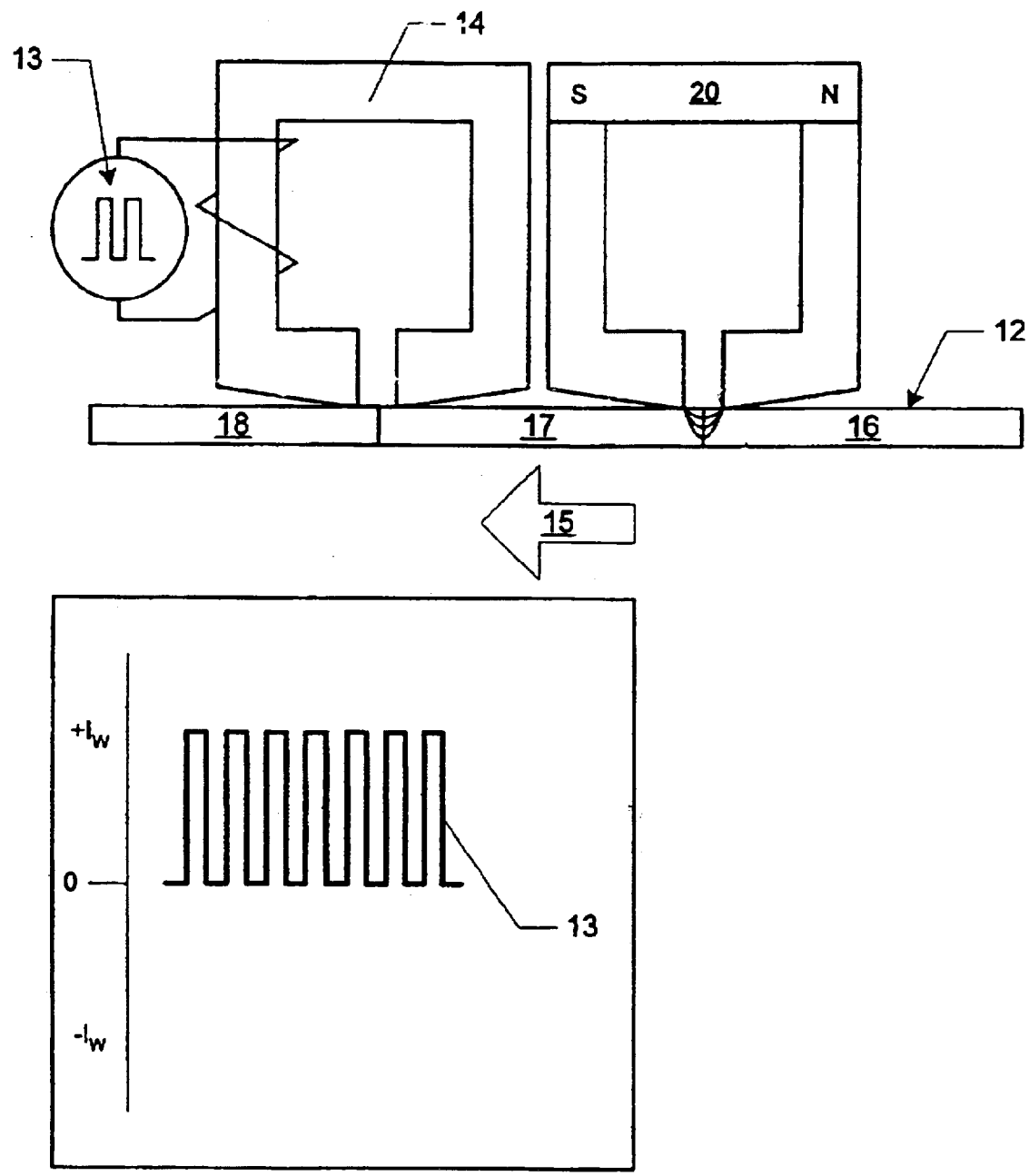

FIG. 5 shows another embodiment of the invention. This embodiment can be described as a passive method because it does not require an additional, or active, DC current signal 11 to place the recording medium 12 at the $M=-M_r$ magnetization level prior to writing the servo pattern. This embodiment is similar to the one illustrated in FIG. 4, but in this embodiment the DC magnetomotive force of the secondary head 10 is generated by a permanent magnet 20 embedded in the head structure. One possible embodiment would employ a single segment of a conventional in-line degaussing magnet, modified to have a slotted surface that defines the servo band position.

Any means for reducing the position error signal by repositioning the reading head is suitable for use with the invention.

The servo signal level can be controlled by modulating the DC current described above, or by controlling how much AC current is used to write the servo pulses. Independently, all embodiments of the invention can be adapted to address the transition from $+M_r$ to $-M_r$ by simply reversing polarity in the heads from what is shown in the Figures and described above. Any such variation is considered equivalent to the invention for the purpose of assessing the scope of the following claims.

We claim:

1. A linear magnetic data recording medium comprising:
   a servo track having a width defined by a DC signal recorded on the medium by a write head; and
   a time-based servo signal written on the servo track, the time-based servo signal comprising at least one servo mark transition at which magnetization moment values of the signal change from a negative value to a positive value.

2. The linear magnetic data recording medium of claim 1, wherein a width defined by the time-based servo signal corresponds to the width of the servo track defined by the DC signal.

3. A method of writing a servo positioning signal, comprising:
   writing a DC signal on a servo track of a linear magnetic data recording medium using a write head; and
   writing a time-based servo signal in the form of transitions between a negative magnetization value and a positive magnetization value on the servo track of the linear magnetic data recording medium using another write head.

4. The method of claim 3, in which the negative value is $-M_r$ and the positive value is $+M_r$, where $M_r$ is a remnant magnetic moment of the medium.

5. The method of claim 3, wherein writing the DC signal produces the negative magnetization value.

6. The method of claim 5, wherein the write head used to write the DC signal defines a servo track width on the medium that corresponds to a target width defined by the time-based servo signal.

7. The method of claim 5, wherein the write head used to write the DC signal comprises a secondary head having a gap oriented parallel to a bisector of an included angle of components of the time-based servo pattern.

8. The method of claim 7, in which the components of the time-based servo pattern are arranged symmetrically with respect to a line perpendicular to a track direction.

9. The method of claim 7, in which the included angle is twelve degrees.

10. A system for writing a servo positioning signal on a linear magnetic data recording medium comprising:

a head that writes a DC signal on a servo track of the linear magnetic data recording medium; and another head that writes a time-based servo signal in the form of transitions between a negative magnetization value and a positive magnetization value on the servo track of the linear magnetic data recording medium.

11. The system of claim 10, wherein the negative value is $-M_r$ and the positive value is $+M_r$, where $M_r$ is a remnant magnetic moment of the medium.

12. The system of claim 10, wherein the head that writes the DC signal produces the negative magnetization value.

13. The system of claim 10, wherein the head used to write the DC signal defines a servo track width on the medium that corresponds to a target width defined by the time-based servo signal.

14. The system of claim 10, wherein the head used to write the DC signal comprises a secondary head having a gap oriented parallel to a bisector of an included angle of components of the time-based servo pattern.

15. The system of claim 14, wherein the components of the time-based servo pattern are arranged symmetrically with respect to a line perpendicular to a track direction.

16. The system of claim 14, wherein the included angle is twelve degrees.

\* \* \* \* \*